United States Patent [19]

Trethewey

[11] Patent Number: 5,240,305
[45] Date of Patent: Aug. 31, 1993

[54] SUSPENSION SYSTEM FOR A COVERING

[76] Inventor: Brig E. A. Trethewey, 4221 W. Dunlap Ave., #320, Phoenix, Ariz. 85051

[21] Appl. No.: 867,960

[22] Filed: Apr. 10, 1992

[51] Int. Cl.$^5$ .............................................. B60J 11/00
[52] U.S. Cl. .................................... 296/136; 296/95.1
[58] Field of Search ........................... 296/136, 95.1; 160/370.2; 150/166, 168

[56] References Cited

U.S. PATENT DOCUMENTS

| | | | |
|---|---|---|---|
| 2,331,600 | 10/1943 | Dillow | 296/95.1 X |
| 2,907,384 | 10/1959 | Spratt et al. | 296/95.1 X |
| 2,950,749 | 8/1960 | MacDonald | 150/166 |
| 4,718,711 | 1/1988 | Rabbit | 296/136 |
| 4,790,591 | 12/1988 | Miller | 160/370.2 |

FOREIGN PATENT DOCUMENTS

| | | | |
|---|---|---|---|
| 256437 | 1/1965 | Australia | 296/95.1 |
| 1016997 | 11/1952 | France | 296/136 |
| 453919 | 6/1968 | Switzerland | 296/95.1 |
| 790852 | 2/1958 | United Kingdom | 296/136 |
| 1559176 | 1/1980 | United Kingdom | 296/95.1 |

Primary Examiner—David M. Mitchell
Assistant Examiner—Gary C. Hoge
Attorney, Agent, or Firm—Cahill, Sutton & Thomas

[57] ABSTRACT

A suspension system for a covering accommodates movement of the covering in response to wind forces and urges return of the covering to its initial mounted position about the object covered. The suspension system at each of opposed ends of the covering includes a bar having one end detachably attached to a first anchor point on the object to be covered. An elastic element extending from the one end of the bar is attached to the covering to accommodate displacement of the covering relative to the first anchor point. An elastic element extends from the other end of the bar to a second anchor point on the object to be covered to accommodate different spacings between the points of attachment. The elastic element extending from the second point is attached to the covering to accommodate displacement of the covering relative to the second point. In a variant of the suspension system, a bar is detachably attached to the covering and an elastic element extends from the bar to a point of attachment on the object or to an anchor point to accommodate movement of the covering relative to the point of attachment while urging return of the covering to its initial location.

42 Claims, 3 Drawing Sheets

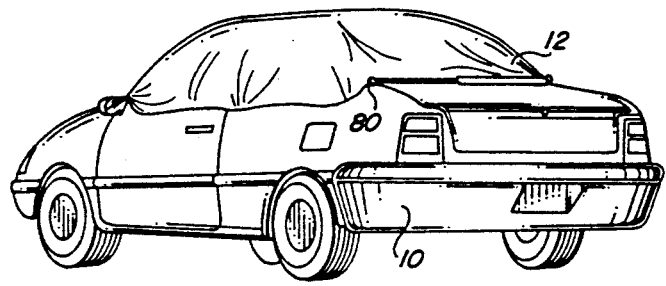
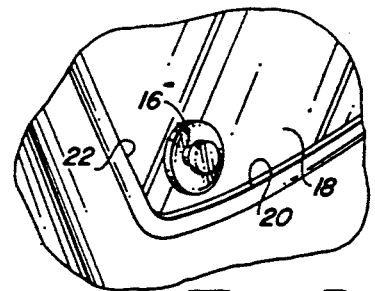
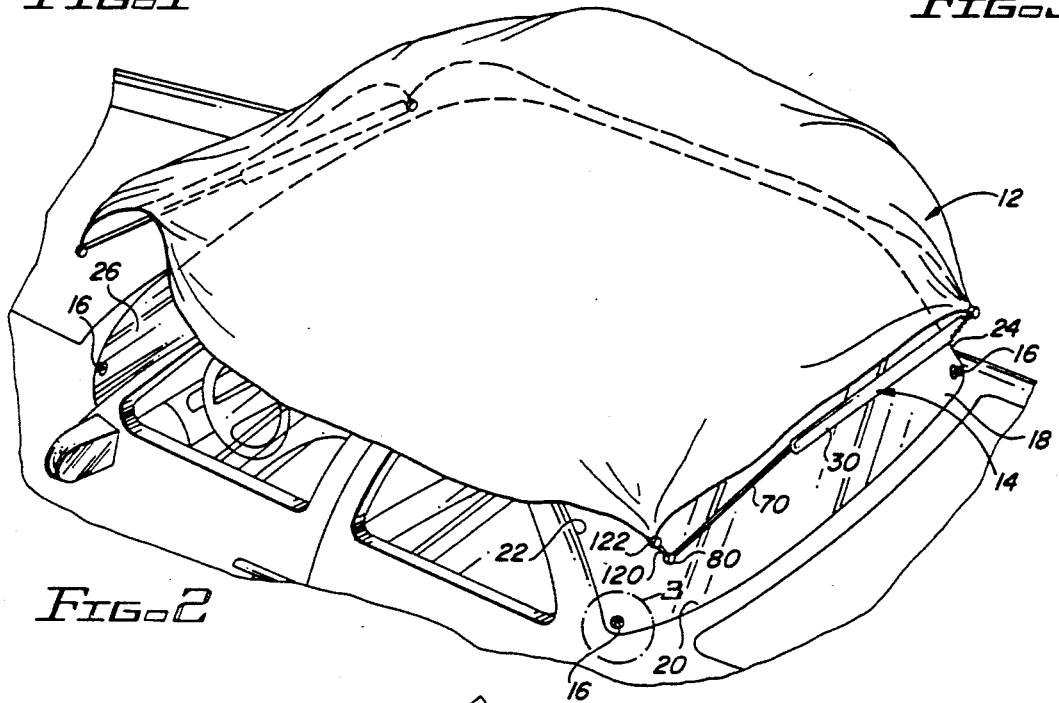
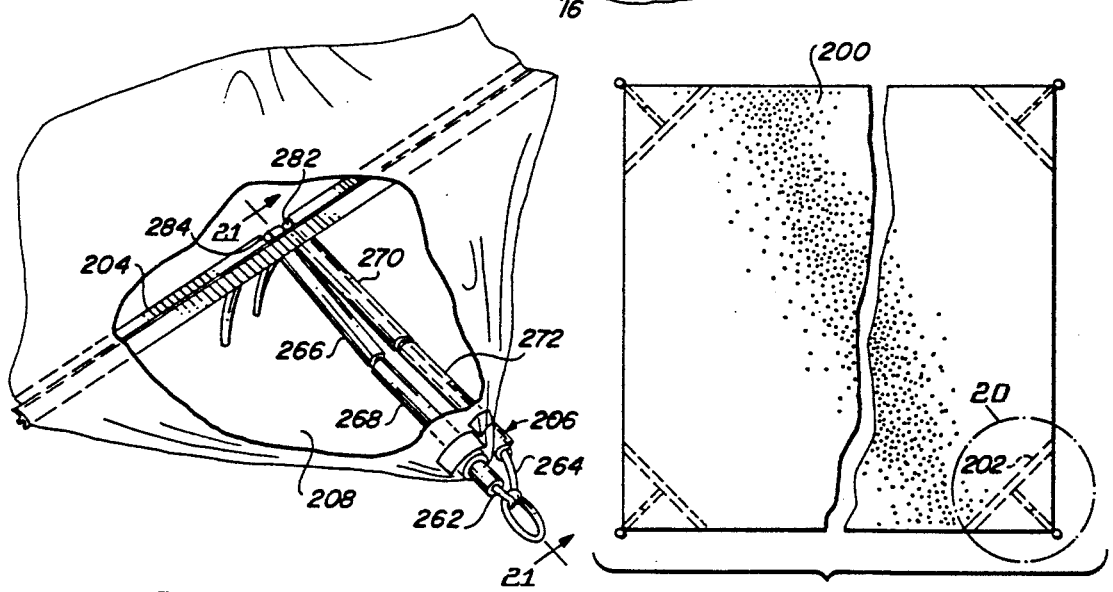

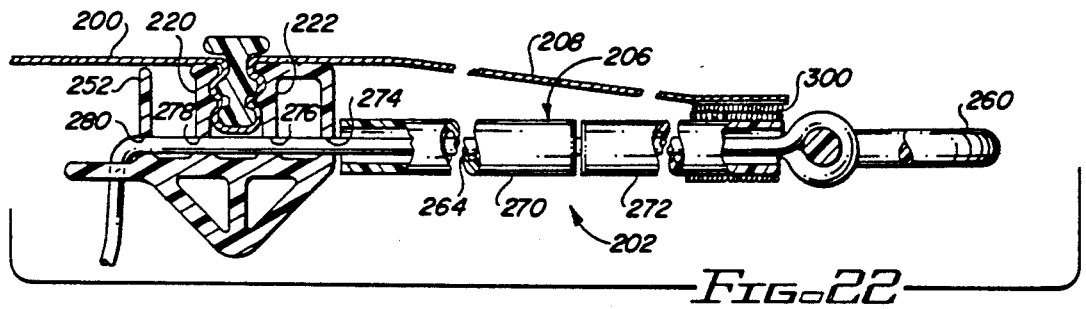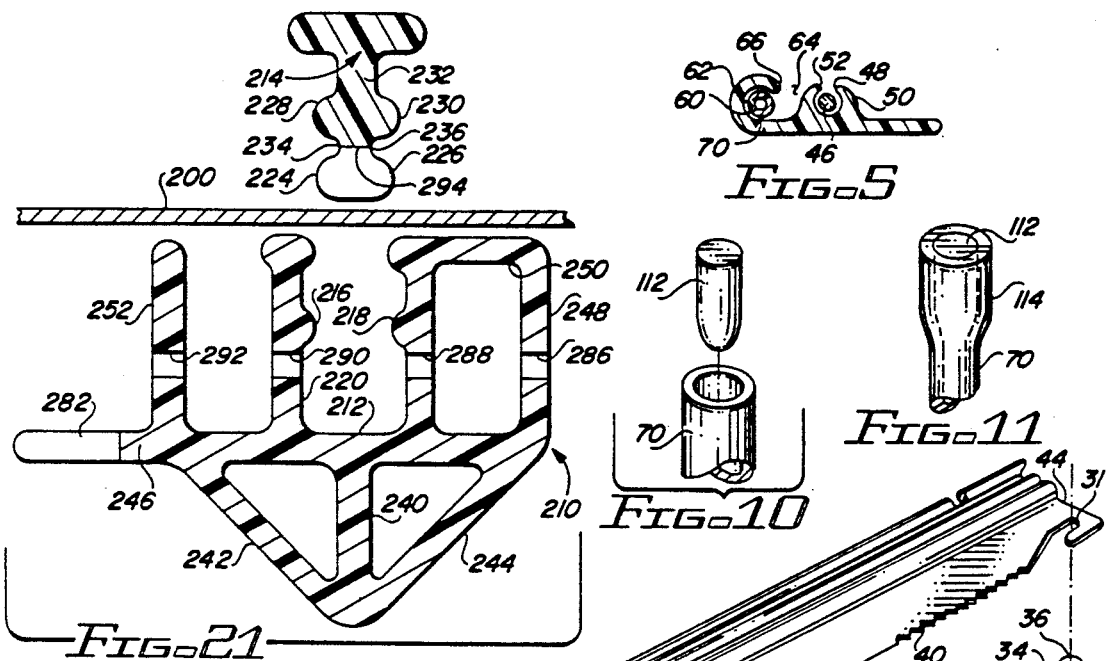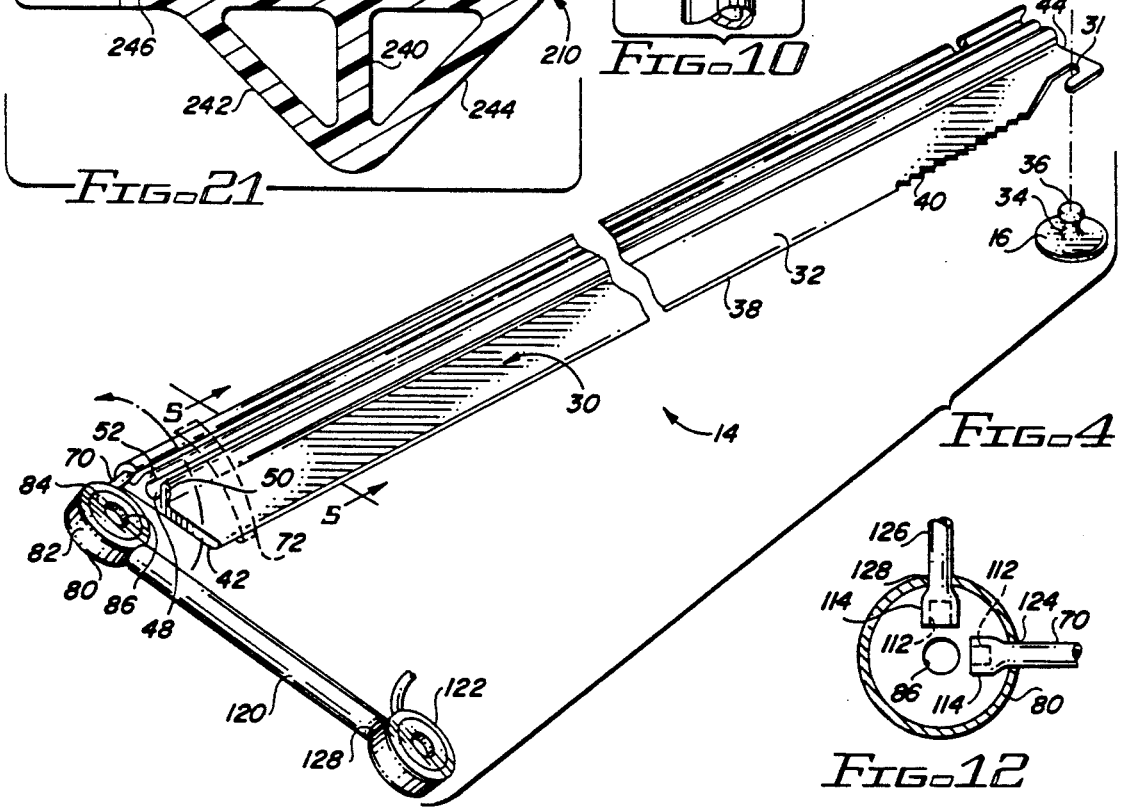

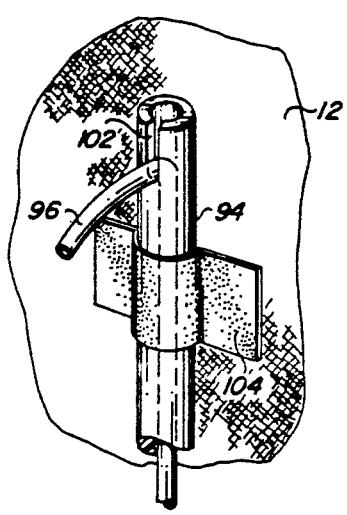
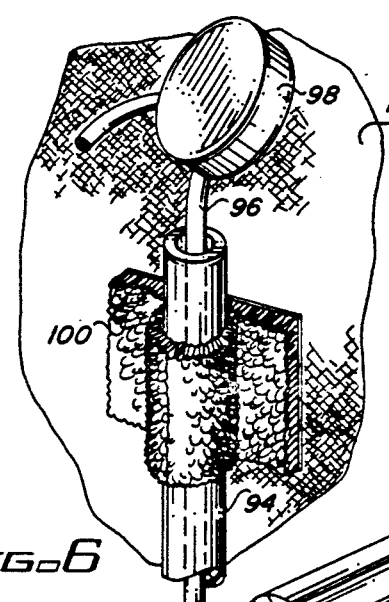
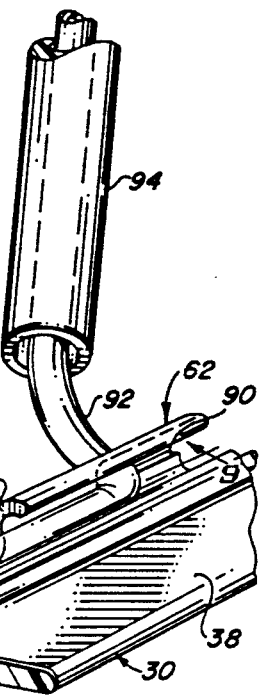
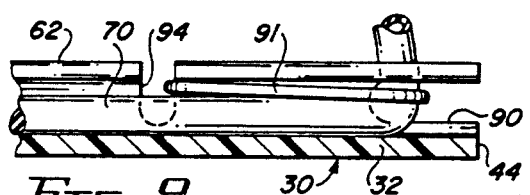
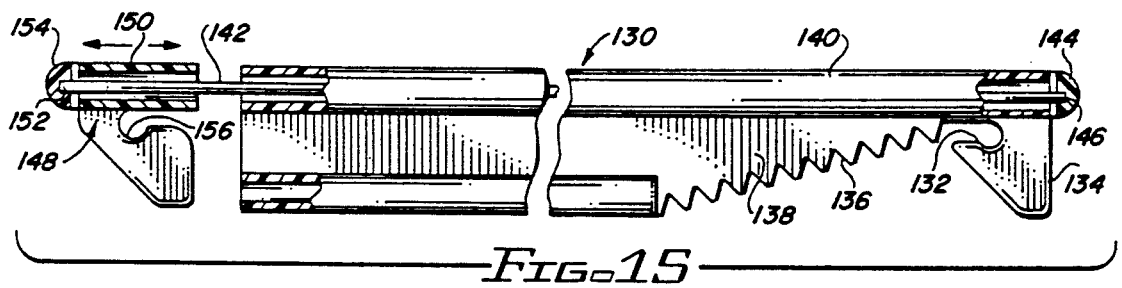
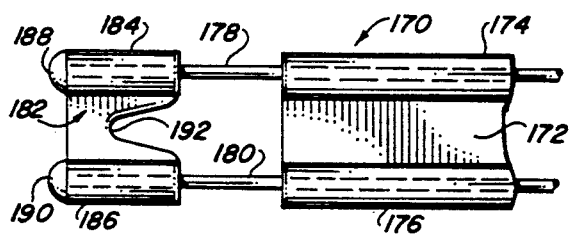
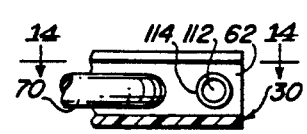
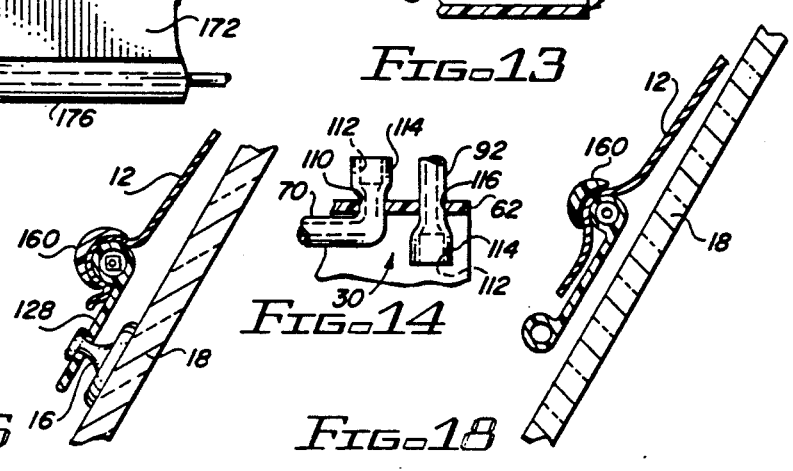

SUSPENSION SYSTEM FOR A COVERING

BACKGROUND OF THE INVENTION

2. Field of the Invention

The present invention relates to suspension systems for coverings and, more particularly, to a suspension system usable with a covering to cover any of various objects while accommodating movement of the covering and urging return of the covering to its initial position.

2. Description of Prior Art

Coverings of relatively light weight material, often referred to as tarpaulins if of heavier weight material, have been used to protect objects against the elements. These coverings are generally attached by cords, ropes or wires engaging grommets to maintain the coverings taut about the object. Because of the usually essentially rigid attachment mechanisms, the coverings may tear in response to movement urged by the wind. Alternatively, the points of attachment, whether grommets or holes in the covering or points of attachment on the object itself, may be damaged as a result of flapping of the covering. Such damage will accommodate further flapping, the damage will increase and the protective function will no longer be served. In an attempt to accommodate movement in response to wind forces, bungee cords or the like maybe used to attach the covering to the object. Elastic elements of this type tend to ameliorate damage to the covering and also provide a restorative force to urge the covering to its initial location after displacement. However, both inelastic and elastic elements for attaching the covering suffer from a common problem. It is generally time consuming for one person to attach each of a plurality of bungee cords, cord sections, a continuous cord or the like intermediate the covering and the object or anchor point. Further, the point of attachment is usually distant from the edge of the covering.

Covers for automobiles, such as passenger cars, have been available to protect the finish against the destructive effects of the elements. These covers are shower cap-like and envelope the whole car. Because of the amount of material necessary to cover even a small car, a substantial mass and volume is present. Because of the shape of the cover and the associated elastic elements, folding of the cover into a compact bundle is essentially impossible. The car covers are generally, as a practical matter, not folded but simply crumpled and stored in the trunk. In small sized trunks, the remaining volume available for other uses is drastically reduced. The mounting and dismounting of such a cover is a laborious process, which discourages their continuing use. Unless such a cover is meticulously mounted, one corner or one end of the cover may become detached in response to wind and a part of the car becomes exposed to the elements. Covers for just the roof and windows are commercially available. The method of attaching such covers include running a cord under the car, suction cups and strings extending from grommets to be tied to parts of the car.

SUMMARY OF THE INVENTION

A suspension system for a car cover shielding the roof and windows of a vehicle includes a bar disposed at opposed ends of the cover for detachable attachment with the lower edges of the windshield and the rear window. One end of the bar is detachably attached to an anchor point mounted adjacent the lower part of a lateral edge of the respective window. An elastic cord disposed within the bar and extending from the other end of the bar is detachably attached to an anchor point disposed at the lower part of the opposite lateral side of the window. Elastic elements extend from each anchor point to a corresponding segment of the cover to urge the cover adjacent the lower edge of the respective window. Sleeves, attached to the cover, enclose and protect the elastic elements against the destructive effects of ultraviolet radiation and permit a latitude in choosing the type of elastic element. Movement of the cover is accommodated by extension of the elastic elements, which elements also urge the edge of the cover to return to its initial position. Attachment of the sleeve to the cover away from the edge of the cover permits zero clearance or space between the edge of the cover and the anchor point. A variant suspension system includes a removably attached bar attached along its length to a covering or tarpaulin to distribute the stresses at the point of attachment. Elastic elements extending from the bar are attached to a part of the object to be protected or to an anchor point. A plurality of such variant suspension systems may be attached to the covering, depending upon the size and configuration of the object to be protected. The elastic elements of the variant suspension system permit shifting of all or a part of the covering in response to wind forces and yet urge the covering to return to its initial position.

It is therefore a primary object of the present invention to provide a suspension system for coverings to accommodate movement of the covering while urging it to return to its initial position.

Another object of the present invention is to provide an easy to use suspension system for use in conjunction with a car cover.

Still another object of the present invention is to provide a suspension system for easily attaching a covering for the passenger compartment of a car to the windshield and rear window.

Yet another object of the present invention is to provide a suspension system for a car covering which permits mounting and dismounting by one person from one side of the car.

A further object of the present invention is to provide a suspension system for coverings usable to cover objects of any size or shape.

A still further object of the present invention is to provide a suspension system for a covering which suspension system is detachably attachable to any location of the covering and to any conveniently available anchor point while providing zero clearance between the perimeter of the anchor point and the covering.

A yet further object of the present invention is to provide an easily detachably attachable suspension system usable with a tarpaulin or other covering.

These and other objects of the present invention will become apparent to those skilled in the art as the description thereof proceeds.

BRIEF DESCRIPTION OF THE DRAWINGS

The present invention will be described with greater specificity and clarity with reference to the following drawings, in which:

FIG. 1 illustrates a passenger car having a covering for the passenger compartment;

FIG. 2 illustrates a suspension system for attaching the covering to the passenger compartment of the car;

FIG. 3 is a detail view taken within circle 3 shown in FIG. 2;

FIG. 4 is a perspective view of a bar forming a part of the suspension system;

FIG. 5 is a cross-sectional view taken along lines 5—5, as shown in FIG. 4;

FIG. 6 illustrates apparatus for attaching the suspension system to the covering;

FIG. 7 illustrates an alternate apparatus for attaching the suspension system to the covering;

FIG. 8 illustrates an extensible element of the suspension system;

FIG. 9 is a cross-sectional view taken along lines 9—9, as shown in FIG. 8;

FIGS. 10 and 11 illustrate a variant for locking attachment of the ends of the elastic tubing used in the suspension system;

FIG. 12 illustrates termination of the tubing within a button;

FIG. 13 illustrates a variant of the apparatus shown in FIGS. 8 and 9;

FIG. 14 is a partial cross-sectional view taken along lines 14—14 shown in FIG. 13;

FIG. 15 illustrates a variant bar of the suspension system;

FIG. 16 illustrates apparatus for attaching the cover to the variant shown in FIG. 15;

FIG. 17 illustrates a further variant of the bar shown in FIG. 15;

FIG. 18 illustrates apparatus for attaching the cover to the further variant shown in FIG. 17;

FIG. 19 illustrates a tarpaulin having a plurality of suspension systems secured thereto;

FIG. 20 is a detail view taken within circle 20 illustrated in FIG. 19;

FIG. 21 is a partial cross-sectional view taken along lines 21—21, as shown in FIG. 20; and FIG. 22 is a cross-sectional view of the bar shown in FIG. 21.

DESCRIPTION OF THE PREFERRED EMBODIMENT

Referring to FIG. 1, there illustrates a representative automobile or car 10 having a conventional passenger compartment. A cover 12 extends across the roof and drapes downwardly on opposed sides to shield the side windows. Similarly, it drapes downwardly across the windshield and the back window. The shielding provided by such a cover will reduce heating of the roof since the rays of the sun will not impinge directly upon the roof. More significantly, the cover will prevent solar radiation from impinging upon and heating the interior of the passenger compartment. It will also eliminate the well known deterioration of plastic and natural materials within the passenger compartment that result from the destructive effects of impinging solar radiation and the high temperatures generated. Further protection against blowing sand, hail, bird droppings, etc. is provided. The remainder of the car is obviously not protected by cover 12 but such lack of protection has little contributory effect upon heating of the passenger compartment.

Referring jointly to FIGS. 1, 2, and 3, suspension system 14 for detachably attaching cover 12 to car 10 will be described. Anchor points 16 are adhesively, or otherwise, attached to the lower corners of rear window 18 adjacent bottom frame 20 and lateral frames 22, 24, respectively. Similarly, anchor points 16 are attached approximate the lower corners of windshield 26. It is to be understood that these anchor points may be mounted on the body panels of car 10 instead of upon the windows.

Bar 30 of suspension system 14 will be described with reference to FIGS. 4 and 5. The purpose of bar 30 is that of permitting mounting of the cover and associated suspension system by one person from one side of the car. To reduce its size for storage purposes it may be hinged to be foldable. It includes a notch 31 disposed in flange 32 for engaging tip 34 of anchor point 16. As illustrated, the tip may have a bulbous end 36 to prevent notch 30 from sliding longitudinally off tip 34. To assist a user in engaging notch 31 with anchor point 16, edge 38 of flange 32 is placed upon the tip and the bar is drawn away from the tip until the tip engages serrated edge 40. The vibration, as well as sound of the serrated edge being drawn across tip 34, provides notification of imminent engagement of notch 31 with the tip.

Preferably, bar 30 is of relatively lightweight material for ease of handling. To provide robustness to the bar as well as to conform the bar with the curvature of the underlying windshield (or body panel), a length of wire 46 is disposed in longitudinal channel 48. This channel is defined by opposing walls 50, 52 having edges overhanging the wire to retain the wire within the channel. Alternatively, a passageway formed along the length and within the bar may be used to seat the wire. A further channel 60 is formed by lip 62 curling back upon itself and defining an ingress slot 64 between edge 66 of the lip and wall 52. A length of elastic material, such as tubing 70, is lodged within channel 60. For reasons that will become apparent below, channel 60 loosely engages the elastic tubing to permit the tubing to extend and retract relatively freely. To insure retention of wire 46 and primarily elastic tubing 70 within channels 48, 60, respectively, one or more bands 72 may encircle bar 30. These bands may be elastic or rigid.

Apparatus for attaching cover 12 to suspension system 14 will be described in reference to FIGS. 4, 6, 7, 8 and 9. To attach tubing 70 to end 44 of bar 30, lip 62 is formed with a notch 90 for crimpingly receiving tubing 70. The tubing may be further retained within the notch by an elastic band 91 stretched between notches 90 and 94 and about tubing 70. Section 92 of elastic tubing 70 extends from notch 90 into and through sleeve 94. End 96 of tubing section 92 is anchored to cover 12 by means of a button 98, which button may be of the same type as button 80 shown in FIG. 4. The button is attached to cover 12 by engaging the covering between the cup and the lid to lock end 96 of the tubing with the cover. Alternatively, a hook and loop fastener 100 may be employed to detachably attach sleeve 94 to cover 12. In such case, button 98 need not be attached to cover 12 and will serve the primary purpose of maintaining end 96 of the elastic tubing adjacent the end of the sleeve. In the alternative, a notch 102 may be formed in the end of sleeve 94 to grippingly receive end 96 of the elastic tubing, as shown in FIG. 7. As also shown in FIG. 7, adhesive tape 104 or other attachment means may be employed to secure sleeve 94 to cover 12.

By having the elastic element (tubing section 92) disposed within a sleeve, several advantages are achieved. First, the elastic element is protected against deterioration from exposure to ultra violet radiation. This permits choosing elastic elements from materials having superior resilience and expansion ratios. Second, the wide choice of elastic elements permits a selection of more light weight and/or more fragile coverings. Third, the elastic elements may be pretensioned in their respective sleeves. Fourth, the perimeter of the covering may be adjacent or overlap the anchor point.

Elastic tubing 70 extends from end 42 of bar 30 to a button 80. The button is a commercially available device that includes a cup 82 having a lid 84, which lid includes a central aperture 86 (alternatively, the central aperture may be in the cup). Tubing 70 enters button 80 through an aperture in the side wall of cap 82. The tubing may extend through the button by exiting through another aperture and into sleeve 120. The terminal end of the tubing enters button 122 through aperture 128 and may exit through another aperture after being locked in the button. Button 122 and/or sleeve 120 may be attached to the covering as illustrated in FIGS. 6 and 7 and described above.

Because each of tubing section 92 and the tubing in sleeve 120 is free to elongate and contract between the point of its emergence from bar 30 and button 80, respectively, and it's anchor point at the terminal end of its respective sleeve, it will have the effect of urging cover 12 toward the bar. Moreover, the elastic nature of the tubing will permit cover 12 to be displaced in response to a wind force without danger of tearing of the cover. Upon cessation of the wind force, contraction of the tubing will urge the cover into its original location. The covering may be manually lifted to permit entry to the car or to lock the cover between the door and the door frame to prevent theft of the covering.

To mount cover 12 with the attached suspension systems, a user would stand on one side of the car and drape the cover over the roof with the suspension systems generally adjacent the respective windshield and rear window. One end 42 of bar 30 is grasped and edge 38 is placed adjacent the far anchor point and drawn toward the user. Shortly after serrated edge, riding upon the anchor point emits a warning signal, the anchor point becomes engaged by notch 31. Button 80 is grasped and drawn towards and anchored with opposing anchor point 16 which will cause tubing 70 to stretch and extend out from within its channel in bar 30. To permit the full length of tubing 70 to elongate, channel 60, retaining the tubing in bar 30, must not be restrictive to preclude or discourage such elongation. It may be noted that suspension system 14 can accommodate a wide range of width between the anchor points. Mounting of the second bar, although being a mirror image of the first bar, is performed similarly. To dismount the cover, the above recited steps are reversed. Upon dismantling, the suspension systems may be rolled, folded or crumpled within the cover for storage purposes.

Referring jointly to FIGS. 10-14, an alternate structure for terminating elastic tubing 70 will be described. Tubing 70 may be terminated approximate end 44 of bar 30 through penetrable engagement with aperture 110 formed in lip 62. To prevent withdrawal of the end of elastic tubing 70, a plug 112 is inserted at the end of the tubing. Such plug will form a bulbous end 114 (see FIG. 11), the cross section of which is greater than aperture 110. Thereby, bulbous end 114 will preclude withdrawal of the end of tubing 70. Section 92 of the elastic tubing may be secured to bar 30 by penetrable engagement with aperture 116 in lip 62. A plug 112 is inserted into the penetrating end of section 92 to form a bulbous end 114, the size of which is greater than aperture 116, to preclude withdrawal of section 92. The terminal end of section 92 penetrating from sleeve 94 may also have inserted a plug 112 to expand the exposed end of section 92. Such an expanded exposed end, being greater than the diameter of the passageway within sleeve 94, will prevent retraction of section 92 into and/or through the sleeve. Further, the tubing sections may be glued or otherwise adhered to or within their respective sleeves. Moreover, a capped peg may be glued or otherwise engaged within the end of the tubing section; assuming that the cap is of a diameter greater than the passageway in the sleeve, it will prevent withdrawal of the tubing section. Elastic tubing 70 extending from end 42 of bar 30 may be terminated within button 80 by inserting the end of the elastic tubing through an aperture 124 in the side wall of the button. The inserted end of the tubing is diametrically expanded by insertion of a plug 112 to form a bulbous end 114 (see FIG. 11). As the bulbous end is of greater diameter than aperture 124, withdrawal of elastic tubing 70 from within button 80 will be precluded. A further section 126 of tubing is inserted through aperture 128 into button 80. The inserted end is expanded by plug 112 to form a bulbous end 114 of sufficient diameter to preclude withdraw through aperture 128. Button 122 may be similar to the button illustrated in FIG. 12 to receive the other end of section 126 through an aperture 128. The end of section 126 inserted through aperture 128 is plugged with plug 112 to form a bulbous end 114 of sufficient diameter to preclude withdrawal through aperture 128. Alternatively, the ends of the two tubing sections extending into a button can be joined by a cord extending into each end of tubing section and adhered or otherwise fastened therein. Furthermore, such cord could join the two tubing sections either interior or exterior of the button; or, a cord could be used to similarly join the tubing section within bar 30 with a tubing section exterior of the bar.

Referring to FIG. 15, a variant 130 of bar 30 will be described. The variant includes a notch 132 disposed at end 134 for engaging one of anchor points 16. A serrated edge 136 is provided to assist in engaging the notch with the anchor point. A base member 138 supports a tube 140, which tube houses elastic tubing 142 and accommodates elongation and contraction of the elastic tubing there within. The elastic tubing is secured to end 134 of base number 138 with a cap 144 grippingly engaging end 146 of the elastic tubing. An anchor 148 includes a tube segment 150 for penetrably receiving end 152 of elastic tubing 142. A cap 154 engages end 152 of the elastic tubing to prevent retraction of the elastic tubing from anchor 148. A notch 156 is developed in the anchor to removably engage the second anchor point (see FIGS. 1 and 2).

As illustrated in FIG. 16, cover 12 is secured to variant 130 by placing the cover over tube 140. A plurality of clips 160 are forced over the cover adjacent to tube 140 to grippingly engage the tube and thereby lock cover 12 therebetween. It may be noted that after installation of variant 130, a clip 160 may be used to attach the cover to tube 150 of anchor 148 to secure the cover along the distance between opposed anchor points 16.

Referring to FIG. 17, there is illustrated a further variant 170 of bar 30. Base 172 includes a pair of parallel tubes 174, 176 for housing two lengths of elastic tubing, 178, 180. Anchor 182 also includes a pair of tubes 184, 186 for penetrably receiving elastic tubings 178, 180, respectively. The ends of these elastic tubings are secured by caps 188, 190, in the manner described above with respect to variant 130. Notch 192 engages anchor point 16 upon mounting of variant 170.

Cover 12 is secured to variant 170 with clips 160 engaging either or both of tubes 174, 176, as illustrated in FIG. 18. Similarly, anchor 182 may be secured to cover 12 by clips 160 engaging one or both of tubes 184, 186.

Referring to FIGS. 19 and 20 there is shown a covering 200, which may be used to cover or protect an object, such as a car, boat, or other object to be shielded from the effects of the elements. It may be noted that covering 200 could also be used as a canopy cover and, if vertically oriented, as a wall, banner, sign, etc. In the configuration of the covering illustrated, a suspension system 202 is disposed at each of the four corners. It is to be understood that fewer or additional suspension systems may be attached to the covering at such locations as may be necessary to maintain the covering in place. Each suspension system 202 is formed of a bar apparatus 204 detachably attached to the covering. An elastic mechanism 206 extends from bar apparatus 204 for attachment with an anchor point. Preferably, the section of the covering, such as corner 208, intermediate the location of the bar apparatus and the elastic mechanism is affixed to the elastic mechanism to prevent flapping, fold over or like uncovering of the object to be protected. The transmission of hold down forces to the covering are applied through bar apparatus 204. The fixation apparatus affixing section 208 with the elastic mechanism is not intended to transmit hold down or retention forces of any consequence.

Referring more particularly to FIGS. 21 and 22, further details of suspension system 202 will be described. The bar mechanism includes an elongated body 210 defining an elongated channel 212. An elongated insert 214 mates with channel 212 and is retained therein by opposed elongated ridges 216, 218 extending from channel walls, 220, 222. These ridges interferingly engage with pairs of opposed ridges 224, 226 and 228, 230 disposed on the depending arm 232 of elongated insert 214. Upon forcing the insert into the channel, ridges 224, 226 ride over opposing ridges 216, 218 with the latter coming to rest in channels 234 and 236 between the adjacent ridges on the arm of the insert. By placing covering 200 across the opening of channel 212, as illustrated in FIG. 22, and forcing insert 214 into the channel, the covering will become lockingly engaged with body 210 by insert 214, as depicted in FIG. 21.

To provide robustness to body 210, a hollow triangular structure defined by central wall 240 and side walls 242, 244 may extend from base 246. Additionally, a hollow rectangular tube like structure defined by side wall 248 and top wall 250 interconnected with base 246 and side wall 222 may be employed. A further flange 252 extends upwardly from base 246. It may be noted that top wall 250 and the upper edge of flange 252 provide support to covering 200, as shown in FIG. 21. The structural configuration of bar apparatus 204 may be substantially modified depending upon the strength and flexibility of the material employed, the flexibility, thickness and conformability of covering 200, as well as the length of the bar apparatus.

Elastic mechanism 206 includes a ring 260 or functionally similar element for attachment to an anchor point, as shown in FIG. 20. A length of elastic tubing is wrapped at its mid point about the ring and the remaining halves 262, 264 extend through pairs of sleeves, 266, 268 and 270, 272 to body 210. Tubing half 264 penetrates side wall 248 through aperture 274, wall 222 through aperture 276, wall 220 through aperture 278 and flange 252 through aperture 280. It is secured in place by engagement with a narrow slot 282 formed in base 246. Tubing half 262 penetrates equivalent apertures in the same walls and is retained in place by a narrow slot 284 in base 246.

In an alternate embodiment, elastic mechanism 206 may be positionally raised with respect to body 210 by forming the apertures for the two tubing halves upwardly displaced from base 246, as represented by aperture 286, 288, 290, and 292 shown in FIG. 22. Since a line through these apertures would interfere with arm 232, the arm would include a cut away section depicted by line 294 (see FIG. 22) to clear the tubing halves lodged within body 210. The portion of the covering extending about the bottom of arm 232 adjacent the cut away section would be forced into the cut-away section to accommodate the tubing halves extending therebeneath Section 208 of covering 200 is secured through to the extremity of sleeves 268, 272 by hook and loop fastening means 300, as depicted in FIG. 21. Other means, including conventional tape, may be used to attach section 208 of the covering to one or more of the sleeves.

Upon deployment of covering 200, ring 260 is drawn toward and anchor point. Such movement of ring 260 will elongate elastic tubings 262, 264 interconnecting the ring with body 210. The elastic nature of the tubing will accommodate some movement of the covering in response to an imposed wind force but relocation of the covering to it's initial position would be continuously urged by the elastic tubing.

By employing a pair of sleeves instead of a single sleeve for each elastic tubing half, suspension system 202 may be collapsed to have all elements essentially adjacent and in alignment with body 210. This permits the suspension system to be folded or wrapped by the covering for storage and transport purposes. The resulting stored or transported configuration of the covering will be of a size essentially not much larger than that of the covering alone. One or many sections of elastic tubing may extend from one location or from several locations on the bar to the anchor point. As one of the purposes of the sleeve is that of securing covering section 208 only one sleeve need be used, but for reasons set forth previously a sleeve for each section of elastic tubing may be used. It may be noted that suspension system 202 may be readily disengaged from one covering and reengaged with another covering by simply segregating insert 214 from body 210 and disengaging the sleeves from the covering. Such disengagement is very easily and quickly performed and readily permits relocation of the suspension system along the edge or at a corner of the covering. This possibility for readily relocating the suspension system permits the covering to be anchored at a location most effective for shielding the object to be covered. In one embodiment of the elastic tubing, it will stretch approximately 700%; this degree of elongation provides a great latitude in locating the respective anchor points.

It may be noted that the anchoring forces imposes upon the covering act through the point of attachment of bar apparatus 204. This permits orientation of the bar apparatus with respect to the covering and the object to be shielded in a manner most effective to maintain the covering in place during disturbing influences and to distribute uniformly the stresses imposed.

While the principles of the invention have now been made clear in an illustrative embodiment, there will be immediately obvious to those skilled in the art many modifications of structure, arrangement, proportions, elements, materials and components used in the practice of the invention which are particularly adapted for specific environments and operating requirements without departing from those principles.

I claim:

1. Apparatus for protecting a vehicle, said apparatus comprising in combination:
   a) first and second sets of anchor points disposed on the vehicle;
   b) a covering for generally shielding the vehicle between said first and second sets of anchor points;
   c) a first rigid suspension system having opposed ends for interconnecting said first set of anchor points and a second suspension system having opposed ends for interconnecting said second set of anchor points; and
   d) first means extending from one of the opposed ends of each of said first and second suspension systems for urging said covering toward respective ones of the opposed ends of said first and second suspension systems; and
   e) second means extending from another of the opposed ends of each of said first and second suspension systems for urging said covering toward respective ones of the opposed ends of said first and second suspension systems.

2. The apparatus as set forth in claim 1 wherein each of said first and second urging means includes means for engaging said covering.

3. The apparatus as set forth in claim 1 wherein each of said first and second urging means includes elastic means for urging said covering toward the respective ones of the opposed ends of said first and second suspension systems.

4. The apparatus as set forth in claim 3 wherein each of said first and second urging means includes a sleeve for housing at least a part of the respective one of said elastic means and means for attaching each of said sleeves to said covering.

5. The apparatus as set forth in claim 1 including further means for urging the opposed ends of at least one of said first and second suspension systems toward one another.

6. The apparatus as set forth in claim 5 including means for conforming the curvature of at least one of said first and second suspension means with the curvature of the adjacent part of the vehicle.

7. Apparatus for protecting a vehicle, said apparatus comprising in combination:
   a) first and second sets of first and second anchor points disposed on the vehicle;
   b) a covering for generally shielding the vehicle between said first and second sets of anchor points;
   c) a first suspension system for securing said covering to said first set of anchor points and a second suspension system for securing said covering to said second set of anchor points;
   d) each of said first and second suspension systems including a first element anchored to the first anchor point and a second element anchored to the second anchor point of respective ones of said first and second sets of anchor points;
   e) first elastic means extending from said first element of each of said first and second suspension systems for urging said covering toward each respective one of said first anchor points;
   f) second elastic means extending from said second element of each of said first and second suspension systems for urging said covering toward each respective on of said second anchor points;
   g) each of said first and second elastic means, a sleeve for housing at least a part of the respective one of said first and second elastic means and means for attaching each of said sleeves to said covering; and
   h) each of said first and second elastic means comprises elastic tubing having a terminal end protruding from the respective one of said sleeves and including a plug inserted within each of said terminal ends to preclude withdrawal of said elastic tubing from the respective one of said sleeves.

8. Apparatus for protecting a vehicle, said apparatus comprising in combination:
   a) first and second sets of first and second anchor points disposed on the vehicle;
   b) a covering for generally shielding the vehicle between said first and second sets of anchor points;
   c) a first suspension system for securing said covering to said first set of anchor points and a second suspension system for securing said covering to said second set of anchor points;
   d) each of said first and second suspension systems including a first element anchored to the first anchor point and a second element anchored to the second anchor point of respective ones of said first and second sets of anchor points;
   e) first elastic means extending from said first element of each of said first and second suspension systems for urging said covering toward each respective one of said first anchor points; and
   f) second elastic means extending from said second element of each of said first and second suspension systems for urging said covering toward each respective one of said second anchor points;
   g) each of said first and second elastic means including means for engaging said covering; and
   h) a sleeve for housing at least a part of the respective one of said first and second elastic means and means for attaching each of said sleeves to said covering, each of said first and second elastic means being pretensioned within the respective one of said sleeves.

9. Apparatus for protecting the front and rear window and the roof of a vehicle, said apparatus comprising in combination:
   a) a first set of anchor points disposed proximate the lower edge of the front window;
   b) a second set of anchor points disposed proximate the lower edge of the rear window;
   c) a covering for covering at least the front and rear windows and the roof of the vehicle;
   d) a first bar;
   e) first means for engaging said first bar with one of the anchor points of said first set of anchor points and further first means for engaging said first bar with the other of the anchor points of said first set of anchor points;
   f) a second bar;
   g) second means for engaging said second bar with one of the anchor points of said second set of anchor points and further second means for engaging said second bar with the other of the anchor points of said second set of anchor points;

h) first extensible means attachable to said covering and extending from said first bar for drawing said covering toward one anchor point of said first set of anchor points;

i) further first extensible means attachable to said covering and extending from said first bar for drawing said covering toward the other anchor point of said first set of anchor points;

j) second extensible means attachable to said covering and extending from said second bar for drawing said covering toward one anchor point of said second set of anchor points; and k) further second extensible means attachable to said covering and extending from said second bar for drawing said covering toward the other anchor point of said second set of anchor points.

10. The apparatus as set forth in claim 9 wherein said further first engaging means includes means for urging said further first engaging means toward said first engaging means.

11. The apparatus as set forth in claim 10 wherein said first extensible means extends from said first engaging means.

12. The apparatus as set forth in claim 10 wherein said further first extensible means extends from said further first engaging means.

13. The apparatus as set forth in claim 12 wherein said first extensible means extends from said first engaging means.

14. The apparatus as set forth in claim 9 wherein said further second engaging means includes further means for urging said further second engaging means towards said second engaging means.

15. The apparatus as set forth in claim 14 wherein said second extensible means extends from said second engaging means.

16. The apparatus as set forth in claim 14 wherein said further second extensible means extends from said further second engaging means.

17. The apparatus as set forth in claim 16 wherein said second extensible means extends from said second engaging means.

18. The apparatus as set forth in claim 9 wherein said covering includes means for covering opposed side windows of the vehicle.

19. The apparatus as set forth in claim 9 wherein said first engaging means comprises a notch for engaging the one anchor point of said first set of anchor points.

20. The apparatus as set forth in claim 19 wherein said first engaging means includes a ratcheted edge for guiding said notch into engagement with the one anchor point of said first set of anchor points.

21. The apparatus as set forth in claim 9 wherein said second engaging means comprises a notch for engaging the one anchor point of said second set of anchor points.

22. The apparatus as set forth in claim 21 wherein said second engaging means includes a ratcheted edge for guiding said notch into engagement with the one anchor point of said second set of anchor points.

23. The apparatus as set forth in claim 9 wherein each of said first extensible means, further first extensible means, second extensible means and further second extensible means comprises an elastic element and a sleeve attachable to said covering for housing at least a part of the respective one of said elastic elements.

24. The apparatus as set forth in claim 9 including means for conforming the curvature of said first engaging means with the curvature of the vehicle adjacent said first engaging means.

25. The apparatus as set forth in claim 9 including further means for conforming the curvature of said second engaging means with the curvature of the vehicle adjacent said second engaging means.

26. Apparatus for securing a covering for the front, rear and opposed side windows of a vehicle, said apparatus comprising in combination:

a) a first set of anchor points disposed proximate the lower edge of the front window;

b) a second set of anchor points disposed proximate the lower edge of the rear window;

c) a first bar having first means for engaging an anchor point of said first set of anchor points;

d) further first means for engaging another anchor point of said first set of anchor points;

e) first means for drawing said further first engaging means toward said first bar;

f) first extensible means attachable to the covering and extending from said first bar for urging the covering toward said first bar;

g) further first extensible means attachable to the covering and extending from said further first engaging means for urging the covering toward said further first engaging means;

h) a second bar having second means for engaging an anchor point of said second set of anchor points;

i) further second means for engaging another anchor point of said second set of anchor points;

j) second means for drawing said further second engaging means toward said second bar;

k) second extensible means attachable to the covering and extending from said second bar for urging the covering toward said second bar; and l) further second extensible means attachable to the covering and extending from said further second engaging means for urging the covering toward said further second engaging means.

27. The apparatus as set forth in claim 26 wherein each of said first and second engaging means comprises a notch.

28. The apparatus as set forth in claim 27 wherein each of said first and second bars includes a ratcheted edge for guiding the respective anchor point to the respective one of said notches.

29. The apparatus as set forth in claim 26 wherein each of said first extensible means, said further first extensible means, said second extensible means and said further second extensible means comprises an elastic element and a sleeve attachable to the covering for housing at least a part of the respective one of said elastic elements.

30. The apparatus as set forth in claim 26 wherein each of said first and second bars includes means for conforming the curvature of said first and second bars to the adjacent curvature of the vehicle.

31. Apparatus for protecting the front and rear window and the roof of a vehicle, said apparatus comprising in combination:

a) a first set of anchor points disposed proximate the lower edge of the front window;

b) a second set of anchor points disposed proximate the lower edge of the rear window;

c) a covering for covering at least the front and rear windows and the roof of the vehicle;

d) a first bar;
e) first means for engaging said first bar with one of the anchor points of said first set of anchor points and further first means for engaging said first bar with the other of the anchor points of said first set of anchor points;
f) a second bar;
g) second means for engaging said second bar with one of the anchor points of said second set of anchor points and further second means for engaging said second bar with the other of the anchor points of said second set of anchor points;
h) first means attachable to said covering for securing said covering with one anchor point of said first set of anchor points;
i) further first means attachable to said covering for securing said covering with the other anchor point of said first set of anchor points;
j) second means attachable to said covering for securing said covering with one anchor point of said second set of anchor points; and
k) further second means attachable to said covering for securing said covering with the other anchor point of said second set of anchor points.

32. The apparatus as set forth in claim 31 wherein said further first engaging means includes means for urging said further first engaging means toward said first engaging means.

33. The apparatus as set forth in claim 31 wherein said further second engaging means includes further means for urging said further second engaging means towards said second engaging means.

34. The apparatus as set forth in claim 31 wherein said first engaging means comprises a notch for engaging the one anchor point of said first set of anchor points.

35. The apparatus as set forth in claim 34 wherein said first engaging means includes a ratcheted edge for guiding said notch into engagement with the one anchor point of said first set of anchor points.

36. The apparatus as set forth in claim 31 wherein said second engaging means comprises a notch for engaging the one anchor point of said second set of anchor points.

37. The apparatus as set forth in claim 36 wherein said second engaging means includes a ratcheted edge for guiding said notch into engagement with the one anchor point of said second set of anchor points.

38. The apparatus as set forth in claim 31 including means for conforming the curvature of said first engaging means with the curvature of the vehicle adjacent said first engaging means.

39. The apparatus as set forth in claim 31 including further means for conforming the curvature of said second engaging means with the curvature of the vehicle adjacent said second engaging means.

40. Apparatus for securing a covering for the front, rear and opposed side windows of a vehicle, said apparatus comprising in combination:
a) a first set of anchor points disposed proximate the lower edge of the front window;
b) a second set of anchor points disposed proximate the lower edge of the rear window;
c) a first bar;
d) first means for engaging said first bar with an anchor point of said first set of anchor points;
e) further first means for engaging said first bar with another anchor point of said first set of anchor points;
f) first means for drawing said further first engaging means toward said first engaging means;
g) first means attachable to the covering for securing the covering with said first bar;
h) further first means attachable to the covering for securing the covering with said further first engaging means;
i) a second bar;
j) second means for engaging said second bar with an anchor point of said second set of anchor points;
k) further second means for engaging said second bar with another anchor point of said second set of anchor points;
l) second means for drawing said further second engaging means toward said first engaging means;
m) second means attachable to the covering for securing the covering with said second bar; and
n) further second means attachable to the covering for securing the covering with said further second engaging means.

41. The apparatus as set forth in claim 40 wherein each of said first and second engaging means comprises a notch.

42. The apparatus as set forth in claim 41 wherein each of said first and second bars includes a ratcheted edge for guiding the respective anchor point to the respective one of said notches.

* * * * *